Jan. 6, 1953 W. V. GOODHUE ET AL 2,624,197
SPINDLE DYNAMOMETER

Filed May 4, 1951 2 SHEETS—SHEET 1

INVENTOR.
WILLIAM V. GOODHUE
HANS H. WORMSER
BY
Albert P. Davis
ATTORNEY

Jan. 6, 1953     W. V. GOODHUE ET AL     2,624,197
SPINDLE DYNAMOMETER

Filed May 4, 1951     2 SHEETS—SHEET 2

INVENTOR.
WILLIAM V. GOODHUE
HANS H. WORMSER
BY
*Albert P. Davis*
ATTORNEY

UNITED STATES PATENT OFFICE 2,624,197

SPINDLE DYNAMOMETER

William V. Goodhue, Warwick, and Hans H. Wormser, Providence, R. I., assignors to Universal Winding Company, Cranston, R. I., a corporation of Massachusetts Application May 4, 1951, Serial No. 224,494

4 Claims. (Cl. 73—136)

More power is required to rotate at a selected speed a textile bobbin which is dynamically unbalanced about its axis of rotation than is required to rotate at the same speed a balanced bobbin of the same weight and mass. Accordingly, the cost of operating a machine in which bobbins are used may be substantially reduced by avoiding or eliminating the use of bobbins which are unbalanced to the extent and in the manner that unnecessarily excessive expenditures of power are required to drive the bobbins at a desired operating speed.

This invention relates to a dynamometer type of bobbin testing device which may be employed to determine the amount of power which is required to rotate a spindle carrying a bobbin at a desired operating speed. The useability of a particular bobbin from the standpoint of power requirements may then be determined by comparing the indicated power requirement of the particular bobbin with that indicated for a reference bobbin of the same type which is known to be accurately balanced. An acceptable excess in power requirement over that of the reference bobbin may be determined empirically, and any bobbins found to have power requirements which exceed the limit may be discarded or reworked to correct the unbalance, as economy may require.

A dynamometer constructed according to this invention comprises a conventional spindle and spindle mounting carried on a movable support. The spindle is adapted to receive a bobbin to be tested and is associated with a driving means having an endless surface, positioned to make a driving engagement with the periphery of the whorl of the spindle. The movable support for the spindle mounting and the spindle is arranged in a manner which permits the spindle to travel along the endless surface of the driving means without interrupting the driving engagement between the driving surface and the whorl of the spindle. The spindle is rotated at high speed by the driving means and a tendency to travel along the driving means in the direction of its movement is imparted to the movable support on which the spindle mounting and the spindle are carried. Means are provided to progressively increase a resistance to such travel of the movable support so that the movable support stabilizes at the point in the path of its travel where the resistance to its travel equals its tendency to do so. The movable support, or one of the members carried thereby, is provided with a pointer which is operatively associated with a fixedly positioned calibrated scale to facilitate determining the extent of movement of the movable support from its initial position.

It may be seen that in a dynamometer of the kind generally described above the power required to rotate a spindle under any given conditions is related to the reading on the calibrated scale which is indexed when the movable support has become stabilized. Accordingly, the amount of power required to drive a spindle carrying a balanced bobbin, and that required to drive the same spindle carrying a bobbin which is unbalanced about its axis of rotation may be simply determined and compared. For purposes of making such a comparison, a carefully balanced bobbin of each type which it is desired to test may be employed to obtain a reading which will thereafter serve as a reference. During succeeding tests the useability of a particular bobbin being tested may be determined by a comparison of the dynamometer reading on the particular bobbin with the reference reading. A permissible deviation from the reference reading may be determined empirically for each type of bobbin which it is desired to test.

The particulars of the design and construction of one embodiment of the present invention, and the manner in which it may be employed, is described in more detail below with reference to the accompanying drawings.

In the drawings:

Figure 3 is a vertical sectional view along the line 3—3 of Figure 2 showing the driving motor of the device in elevation; and Figure 4 is a horizontal section on line 4—4 of Figure 1.

Figure 1:
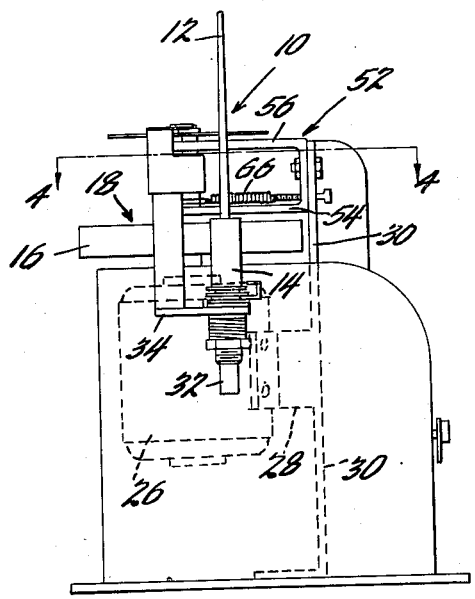
Figure 1 is a side elevational view of the embodiment of the invention illustrated showing the arrangement of the spindle carried by the movable support and the spindle driving means.
Figure 2:
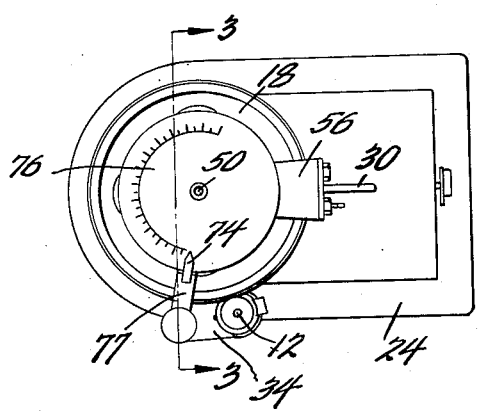
Figure 2 is a top plan view of the dynamometer illustrated in Figure 1.

Referring to Figure 1 it may be seen that the embodiment of the invention illustrated comprises a conventional spindle 10 having a tapered blade 12 which is adapted to be received in the central core of a bobbin of the kind which it is desired to test on the dynamometer. The spindle is provided with the conventional whorl 14, and the spindle is supported so that the whorl is in driving engagement with the vertically disposed circumferential surface 16 of a driving drum 18. As may be seen most clearly in Figure 3, the driving surface of the drum which engages the spindle whorl may consist of a layer of cork 19 having a resilient backing 20 which is fixed to the metal surface of the driving drum.

The spindle driving drum 18 is mounted for rotation on the upper end of the drive shaft 22 which extends upwardly through an aperture in the machine casing 24 from the motor 26. The motor 26 is affixed to a bracket 28 (shown in dotted lines in Figure 1) which bracket is mounted on the vertically disposed portion of the frame member 30, shown partially in dotted lines in Figure 1.

The spindle 10 is supported vertically in the conventional manner on a spindle step 32 which in turn is mounted on the horizontally disposed plate 34. The plate 34 comprises one part of a movable support for the spindle which permits the spindle to travel along the driving surface 16 of the drum while maintaining its driving engagement therewith. The plate 34 is affixed to the bottom end of the vertically disposed post 36. The post 36 is rotatably supported in bearings 38, 40 which are positioned in either end of a vertically disposed bore in the depending portion 42 of an L-shaped swing arm 44. The horizontally disposed leg 46 of this arm is provided with a boss 48 (shown in dotted lines in Figure 3) through which the vertically disposed pivot post 50 is passed. The pivot post 50 is supported on the U-shaped bracket 52 which is fixed to the upper end of the frame member 30. The lower end of the pivot post is affixed to and rests upon the upper surface of the lower leg 54 of the bracket and the upper end of the post extends through an aperture provided in the upper leg 56. An annular spacing collar 58 which is fixed to the underside of the boss 48 encircles the post 50 and serves as a bearing for the pivotal movement of the arm 44 on post 50.

A spring 60 is coiled about the upper end of the post 36, having one end fixed to the post and the other end fixed to a pin 62 which is mounted on the arm 44. This spring tends to rotate the post 36 in the direction which will cause the arm 34, fixed to the lower end of the post, to move radially towards the driving drum 18, whereby the spindle 10, supported on the plate 34, is yieldingly maintained in driving engagement with the drum.

It will be apparent that the driving force applied to the spindle whorl by the driving drum will have a component tangential to the point on the whorl at which the whorl is engaged with the driving drum, and that this component will impart a tendency to the spindle to move in the direction of the movement of the driving drum. This component of force tending to so move the spindle will vary with the resistance to turning which is offered by the spindle. It will be seen that the dynamometer construction described above permits the spindle to travel along the surface 16 of the driving drum in response to this component of the driving force without disturbing the driving engagement between the spindle whorl and the driving drum. It will thus be seen that the power required to drive the spindle under a given set of conditions may be ascertained by measuring the force required to balance the tendency of the spindle to travel along the driving surface of the drum. For this purpose there is provided a coil spring 66, seen best in Figures 1 and 4, which is connected to the movable support for the spindle to resist travel of the support along the driving surface of the drum in the direction of its movement. One end of the spring 66 is fixed to a cord 68 which is partially wrapped around the bearing collar 58 affixed to the arm 44. The cord is secured to the collar by means of a pin 70 which extends radially from the circumferential surface of the collar. The other end of the spring is fixed to an adjusting screw 72 which has an intermediate portion which threadedly engages a horizontally disposed aperture extending through the frame member 30 and the base of the bracket 52.

Rotation of the spindle by the driving drum will cause the movable supporting means for the spindle to travel in a counter-clockwise direction, as viewed in Figure 4, until the resistance to extension by the spring 66 equals the force impelling the movable supporting means to travel along the surface of the driving drum in the direction of its movement.

A pointer 74 is fixed to the upper part of a casing 77 which encloses the arm 44, and this pointer is positioned to cooperate with a calibrated scale inscribed on the disc 76 which is fixed on the upper end of the pivot post 50 so that the extent to which the movable support is deflected before reaching a balance with the spring 66 may be readily ascertained in terms of units marked on the scale.

The effect of unbalance in a bobbin in terms of the additional power required to rotate a spindle carrying the bobbin at its normal operating speed can be ascertained by first placing on the spindle 10 a bobbin which is known to be satisfactorily balanced. The speed of the driving motor 26 is then adjusted to cause the driving drum 18 to rotate the spindle at the speed at which it is normally run when carrying a bobbin of the kind being tested. The movable support for the spindle will travel along the driving drum surface until it has achieved a balanced with the spring 66. The scale reading indicated by the pointer 74 may then be used as a reference for the type of bobbin being tested. Other bobbins, whose condition of unbalance is unknown, or those in which the effect of their unbalance is unknown, may be similarly tested. The scale readings obtained at the point where the movable support stabilizes may then be compared with the reference figure to determine the effect of whatever unbalance may exist in terms of the increased amount of power required to drive the spindle carrying the bobbin at the selected operating speed. The determinations made in this manner faithfully indicate the effect of the bobbin unbalance under operating conditions, since the dynamometer provides a spindle mounted and driven in the manner which is conventionally employed in machines in which spindles of the type illustrated are normally used.

Having thus described the invention it is desired that the following claims be secured by Letters Patent:

1. A dynamometer for determining the effects of bobbin unbalance in terms of power required to drive a textile spindle carrying the bobbin comprising a spindle including a whorl, movable means for rotatably supporting said spindle, a spindle driving means having an endless surface drivingly engaging the said whorl, said spindle supporting means being movable to permit the movement of said spindle along said endless surface while maintaining said whorl in contact therewith, and means for yieldingly resisting the movement of said spindle along said endless surface.

2. A dynamometer for determining the effects of bobbin unbalance in terms of power required to drive a textile spindle carrying the bobbin comprising a spindle including a whorl, a spindle driving drum in peripheral engagement with said whorl, means rotatably supporting said spindle for movement along the periphery of said driving means, means for yieldingly resisting the movement of said spindle along the periphery of the drum, a pointer carried on said supporting means, and a fixedly positioned calibrated scale positioned to cooperate with said pointer.

3. A dynamometer for determining the effects of bobbin unbalance in terms of power required to drive a textile spindle carrying the bobbin comprising a spindle, a spindle driving drum in peripheral driving engagement with said spindle, a plate member, a spindle step for rotatably supporting said spindle mounted on said plate member, a pivotally supported arm for carrying said plate member in a path concentric with the periphery of said driving drum, means for urging said plate towards said drum to maintain a yielding engagement between said drum and said spindle, means for yieldingly resisting movement of said spindle along the periphery of said drum, a pointer carried by said arm, and a fixedly positioned calibrated scale positioned to cooperate with said pointer.

4. A dynamometer for determining the effects of bobbin unbalance in terms of power required to drive a textile spindle carrying the bobbin comprising a vertically disposed frame member, a bracket fixed to the upper portion of said frame member, a vertically disposed pivot post mounted on said bracket, an arm pivotally supported on said post for horizontal swinging movement, said arm having a depending portion at its distal end, a horizontally disposed plate member, means for pivotally supporting said plate member in the depending portion of said arm, a spindle mounting supported on said plate member, a spindle rotatably supported on said mounting, a spindle driving drum positioned in peripheral engagement with said spindle and mounted for rotation about the axis of said post, means for driving said drum, means for urging said plate member towards said drum to maintain a yielding engagement between said drum and said spindle, means for yieldingly resisting movement of said spindle along the periphery of said driving drum, a pointer carried by said arm, and a fixedly positioned calibrated scale positioned to cooperate with said pointer.

WILLIAM V. GOODHUE.
HANS H. WORMSER.

REFERENCES CITED

The following references are of record in the file of this patent:

UNITED STATES PATENTS

| Number | Name | Date |
|---|---|---|
| 1,557,956 | Zubaty | Oct. 20, 1925 |